United States Patent [19]

El-Shoubary et al.

[11] Patent Number: 5,480,558
[45] Date of Patent: Jan. 2, 1996

[54] ELECTRIC ENHANCEMENT OF ADSORBENT FLOTATION SEPARATION

[75] Inventors: Youssef El-Shoubary, Clifton Park; Donald E. Woodmansee, Schenectady, both of N.Y.

[73] Assignee: General Electric Company, Schenectady, N.Y.

[21] Appl. No.: 254,840

[22] Filed: Jun. 6, 1994

[51] Int. Cl.⁶ .................................................. B01D 17/035
[52] U.S. Cl. ............................................ 210/703; 210/243
[58] Field of Search ...................... 210/703, 748, 210/776, 243, 259, 691, 221.1; 204/149, 275

[56] References Cited

U.S. PATENT DOCUMENTS

| | | | |
|---|---|---|---|
| 4,197,180 | 4/1980 | Woodward | 204/275 |
| 4,778,584 | 10/1988 | Ihoue et al. | 204/272 |
| 4,783,263 | 11/1988 | Trost et al. | 210/638 |
| 5,240,570 | 8/1993 | Chang et al. | 204/130 |

*Primary Examiner*—Frank Spear
*Attorney, Agent, or Firm*—Paul R. Webb, II

[57] ABSTRACT

An adsorbent electrode assembly electrically enhances contaminant removal in soil washing processes. The adsorbent electrode assembly is immersed in the froth of a flotation cell and connected to one pole of a battery. The other pole of the battery is connected to the flotation cell tank. The resulting electric charge (either positive or negative depending on the nature of the contaminant) applied to the adsorbent electrode assembly attracts contaminants in the froth to the adsorbent electrode assembly which adsorbs them. The adsorbent electrode assembly is then easily removed from the cell for replacement or regeneration. The adsorbent electrode assembly can comprise one or more carbon rods, a carbon screen, or a porous bag filled with an adsorbent material and having an electrode disposed therein.

16 Claims, 3 Drawing Sheets

5,480,558

ELECTRIC ENHANCEMENT OF ADSORBENT FLOTATION SEPARATION

BACKGROUND OF THE INVENTION

This invention relates generally to removing contaminants such as PCBs from soil and more particularly to using an electrically-charged adsorbent electrode to enhance contaminant removal.

Hazardous waste sites are drawing increasing attention and concern, and the need to clean up such areas is becoming more and more apparent. Traditional cleanup operations are, however, very costly as well as technically difficult. They often involve the transportation of large volumes of contaminated materials to specially designated and/or designed dump areas. This transportation of large volumes of contaminated materials, often over relatively long distances, is usually one of the most significant cost factors in cleanup operations of this kind. Moreover, equally large volumes of uncontaminated materials such as soils are often brought from distant locations to refill the cleanup site.

Local incineration and in situ cleanup processes are the most common alternative cleanup methods. However, the fuel costs of incineration are quite large. Incineration may also lead to air pollution problems which are sometimes even more pernicious than the original soil contamination problem being addressed. In situ cleanup operations, which usually involve the injection of solvents into the ground and then the extraction of the resulting solvent/contaminant solution, require extensive drilling and sampling. Very large volumes of expensive solvents and/or water are required by such in situ methods. In situ cleanup methods are inconclusive because it is very difficult to assure the completeness of the cleanup. Portions of a contaminated area can thus be missed. Moreover, solvents can be lost in fissures in the earth and can escape to previously uncontaminated areas where the solvents themselves become contaminants. Solvent containment problems are often dealt with by isolating the contaminated area from adjacent uncontaminated areas using walls and screens of one kind or another. However, the cost of constructing these barriers often becomes prohibitive.

An alternative to in situ methods is ex situ methods in which the contaminated soil is excavated, treated, tested and then put back in the same location. Although the excavation cost is of concern, ex situ methods avoid the problems of extensive drilling and sampling, incomplete results and secondary contamination. Soil washing is one promising ex situ method for treating contaminated soils. The process typically consists of first screening the excavated soil and then separating fine particles (10–15 microns) from the soil using a hydrocyclone. The remaining soil fractions undergo attrition scrubbing to liberate the contaminants. A flotation cell is used to remove the liberated contaminants from the soil slurry. The contaminant is collected in the froth, while the cleansed soil is collected as the tails. Chemical additives are typically added to the flotation cell to produce a sturdy froth and facilitate collection of the contaminants. The residence time in the flotation cell has a direct impact on the cost of the overall process, wherein a shorter residence time reduces cost.

One known process used to reduce the residence time in flotation cells is the addition of surfactants which emulsify the contaminants. However, the surfactants generally cannot be separated from the soil for reuse. Thus, no recycling of the surfactants can occur. In addition, many surfactants can tend to produce strong froth which must be controlled to prevent spillage. Another step used to reduce residence time is the addition of adsorbent materials such as powdered or granular carbon. While such adsorbent materials are typically capable of being recycled, the separation of these adsorbent materials from the soil is a time consuming and costly process.

Accordingly, there is a need for a soil washing process which reduces the flotation cell residence time without using materials that are not easily recycled.

SUMMARY OF THE INVENTION

The above-mentioned needs are met by the present invention which provides an electrically enhanced soil washing process and apparatus. Specifically, the present invention provides a flotation cell for use in a soil washing system that comprises a tank and an adsorbent electrode assembly disposed in the tank. A DC source of electricity such as a battery has a first pole connected to the adsorbent electrode assembly and a second pole connected to the tank. The adsorbent electrode assembly can comprise one or more carbon rods, a carbon screen, or a porous bag filled with an adsorbent material and having an electrode disposed therein. In operation, the adsorbent electrode assembly is immersed into the froth of the flotation cell, and a suitable electric charge (either positive or negative depending on the nature of the contaminant) is applied to the adsorbent electrode assembly. The charge attracts the contaminants in the froth to the adsorbent electrode assembly which adsorbs them. The adsorbent electrode assembly is then easily removed from the cell for replacement or regeneration.

Thus, the present invention is able to reduce the flotation cell residence time through the electrically-enhanced adsorbent assembly. Furthermore, the adsorbent electrode assembly is easier to remove from the cell than conventional adsorbent materials, thus facilitating recycling. Further advantages are realized by the present invention in that the required equipment can be hauled to the site of the contamination. Thus, much of the bulk material transportation costs otherwise associated with a given cleanup operation can be eliminated.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
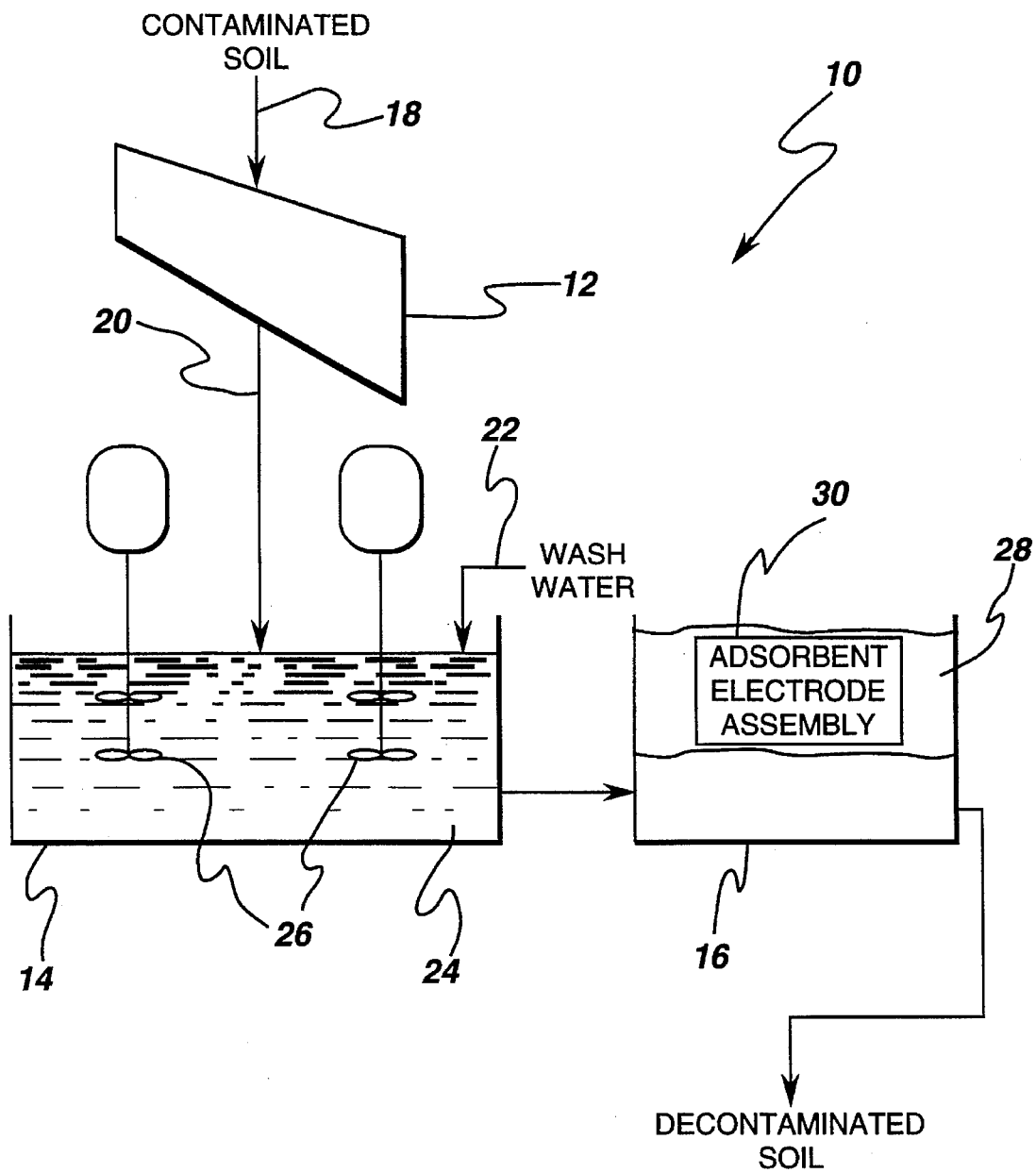
FIG. 1 is a block diagram of a soil washing system in accordance with the present invention.

Referring to the drawings wherein identical reference numerals denote the same elements throughout the various views, FIG. 1 shows a soil washing system 10 of the present invention wherein soil or other material contaminated with contaminants such as PCBs can be treated. As used herein, the term "contaminant" refers to toxic, hazardous or otherwise undesirable material. While the removal of PCBs is of prime concern, the present invention is also capable of removing many other contaminants. Moreover, the present invention is not limited to the treatment of soils, but is also applicable to other materials such as sludges, sediments, rock, aqueous streams and the like.

The soil washing system 10 includes a material handling process unit 12, an attrition scrubber 14 and an electrically-enhanced flotation cell 16 connected in the order given. Although only one flotation cell is shown, it should be understood that the present invention includes use of additional flotation cells. Contaminated soil or other material 18 is initially fed to the material handling process unit 12 wherein the soil 18 undergoes initial handling steps such as screening and crushing. Generally, the material handling process unit 12 comprises a screen capable of separating coarse material (e.g., particles above 4 mm, trash, rocks, tree limbs, etc.) which is typically not contaminated from the fine material which is contaminated. It should be noted that some contaminated soil will not need such initial process steps. In any event, the contaminated soil 20 not separated by the material handling process unit 12 is delivered to the attrition scrubber 14. The attrition scrubber 14 also receives a liquid stream 22 such as wash water which is mixed with the soil 20 to make a soil slurry 24. The attrition scrubber 14 comprises a tank having one or more stirrers 26 which typically comprise two impellers on a rotating shaft. The impellers on each shaft are positioned with opposite pitches so that the respective flows impact one another. This action causes much mixing and surface abrasion which liberates the contaminants from the soil. The contaminants then exist as emulsions in the wash water.

The slurry 24 is fed to the flotation cell 16 to recover the emulsion from the wash water and provide clean soil tailing. In this operation, air or other gas bubbles are introduced into the flotation cell 16. The liberated contaminants in the wash water, which would rather attach to an air/water interface than stay in suspension, attach to the bubbles and rise to the surface where a froth 28 is created. Thus the contaminants are contained in the froth 28, while the now decontaminated soil remains in the wash water in the lower portion of the flotation cell 16. The contaminants are removed using an adsorbent electrode assembly 30 located in the froth 28. The adsorbent electrode assembly 30, which is easily removed from the flotation cell 16, attracts and adsorbs the contaminants. The collected contaminants are then disposed of in an approved manner as is known in the art. The decontaminated soil is deliquified and returned to its site.

Figure 2:
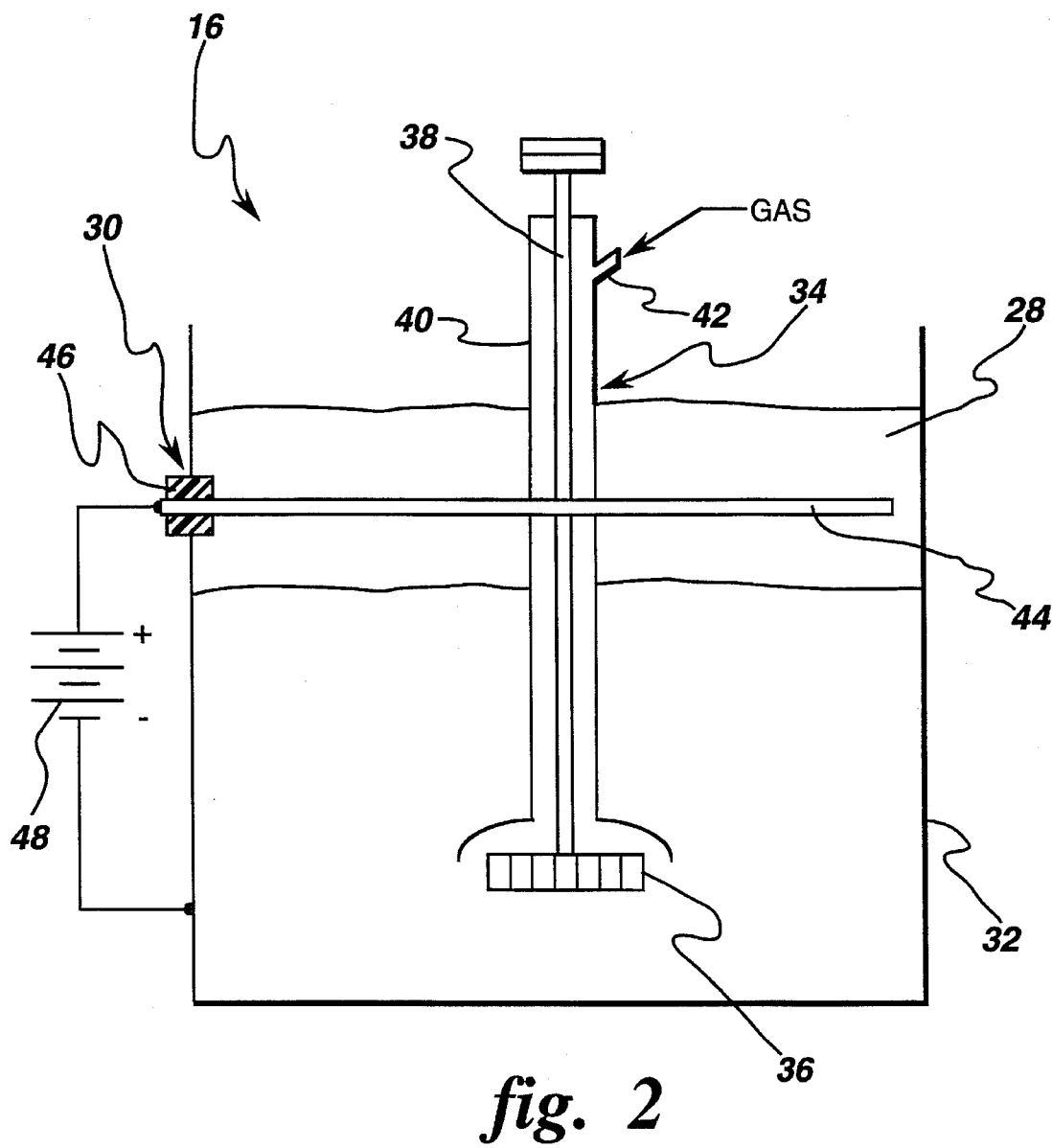
FIG. 2 is a cross-sectional side view of a flotation cell including a first embodiment of the adsorbent electrode assembly of the present invention.

FIG. 2 shows the flotation cell 16 and the adsorbent electrode assembly 30 in more detail. The flotation cell 16 comprises a tank 32 having at least one bubble injecting mechanism 34 disposed therein. The mechanism 34 comprises an impeller 36 on a rotatable shaft 38. A hollow shaft 40 having a gas injection port 42 encloses the impeller 36 and the rotatable shaft 38. In operation, air or another gas is injected down the hollow shaft 40 via the port 42 and is released near the bottom of the tank 32. The gas is broken into fine bubbles by the rotating impeller 36. The bubbles rise to the surface (attaching contaminants as they rise) and create the froth 28.

The adsorbent electrode assembly 30 is attached to a side wall of the tank 32 and comprises a carbon rod 44 and a resilient mounting grommet 46. The grommet 46 is snugly positioned in a hole in the side wall of the tank 32 and the carbon rod 44 is inserted through the grommet 46. Once inserted, the carbon rod 44 preferably extends nearly across the entire width of the tank 32. As shown in FIG. 2, the carbon rod 44 extends in front of the bubble injection mechanism 34. The end of the carbon rod 44 which protrudes from the tank 32 is connected to one of the poles (the positive pole as shown in FIG. 2) of a DC power source 48 such as a battery. The battery 48 may have a voltage in the range of 10–110 volts. The other pole (the negative pole in FIG. 2) of the battery 48 is connected to the tank 32 which is made of an electrically conducting material. The grommet 46 is made of an electrically non-conducting material so as to insulate the carbon rod 44 from the tank 32 in addition to supporting the rod 44.

Thus, the carbon rod 44 becomes a charged electrode which attracts the contaminants in the froth 28. As the rod 44 is made of carbon, which is an excellent adsorbent, the contaminants will adhere and adsorb on the carbon rod 44. Whether the carbon rod is provided with a positive (as shown in FIG. 2) or negative charge depends on the nature of the contaminants which are being collected. Once the contaminants have been adsorbed, the carbon rod 44 is removed from the tank 32 for replacement or regeneration. The carbon rod 44 is easy to remove because it is not in powdered or granular form. Regeneration of the carbon rod 44 can be achieved by using low heating to drive off the contaminants or solvents which dissolve the contaminants. In the case of restricted and highly regulated contaminants, the carbon rod 44 can be incinerated.

Although only one carbon rod is shown, it should be understood that the adsorbent electrode assembly 30 can comprise a plurality of carbon rods disposed side-by-side in the froth 28. Moreover, instead of being mounted from the side of the tank 32, one or more carbon rods could be suspended above the tank 32 and arranged to extend downward into the froth 28.

A number of experiments were conducted to demonstrate the effectiveness of the electric enhancement of the present invention. In the first experiment, four runs were performed using the carbon rod-type adsorbent electrode assembly of FIG. 2. In each instance, sea sand contaminated with motor oil (10,000 ppm) was used as the feedstock. The contaminated soils were directly entered into the flotation cell and mixed with water (1:1 by weight). The flotation residence time was 15 minutes. A 24 volt battery was used to supply the electric charge to the carbon rod. The motor oil concentration was obtained using EPA test method 413.1 gravimetric.

The carbon rod was positively charged in the first run. The flotation tails showed a total oil and grease contamination of 1400 ppm and the carbon loading was 2.7% by weight. In the second run, the carbon rod had no electric charge. The flotation tails contained motor oil at a concentration of 3889 ppm and the carbon loading was 0.4% by weight. In the third run, the carbon rod was negatively charged. The flotation tails showed a total oil and grease contamination of 3400 ppm and the carbon loading was 0.9% by weight. To confirm the positive results of the first run, the carbon rod was again positively charged in the fourth run. The flotation tails showed a total oil and grease contamination of 1433 ppm and the carbon loading was 3.4% by weight.

In a second experiment, two runs were performed again using the carbon rod-type adsorbent electrode assembly of FIG. 2. The feedstock used in each instance was soil contaminated with 284.8 ppm of the PCB Aroclor 1248. The contaminated soils were directly entered into the flotation cell and mixed with water (1:1 by weight). The flotation residence time was 15 minutes. A 24 volt battery was used to supply the electric charge to the carbon rod. The PCB concentration was obtained using EPA test method 413.1 gravimetric.

The carbon rod was positively charged in the first run. The flotation tails showed a PCB contamination of 2.67 ppm and the carbon loading was 0.7% by weight. In the second run, the carbon rod had no electric charge. The flotation tails contained the PCB at a concentration of 44 ppm and the carbon loading was 0.12% by weight.

Figure 3:
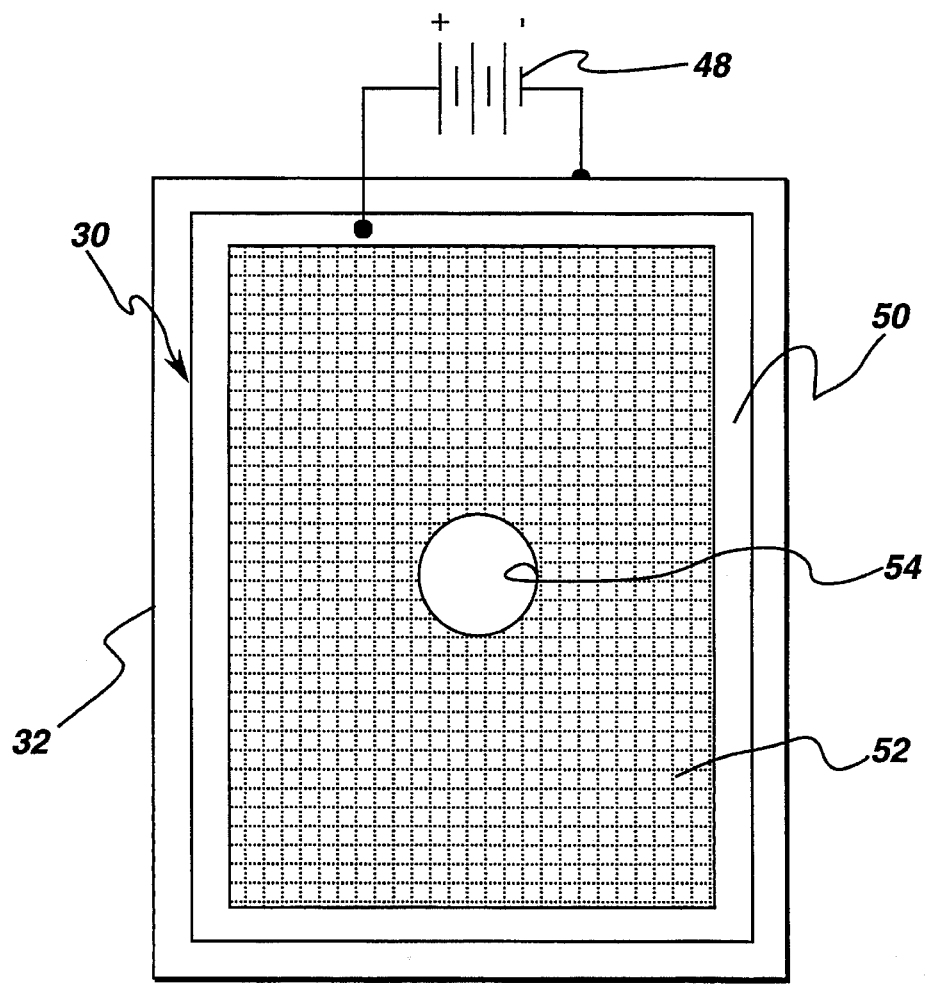
FIG. 3 is a top view of a flotation cell including a second embodiment of the adsorbent electrode assembly of the present invention.

FIG. 3 shows a second embodiment of the adsorbent electrode assembly 30. In this embodiment, the adsorbent electrode assembly 30 comprises a rectangular frame 50 which supports a carbon screen 52. The screen 52 has a center opening 54 formed therein so as to permit it to be placed over the bubble injecting mechanism 34 (not shown in FIG. 3). Thus, the screen 52 can be retractably suspended in the tank 32 for immersion in the froth. The frame 50 is made of an electrically conducting material and is connected to one pole of the battery 48. The other pole of the battery 48 is again connected to the tank 32. Like the carbon rod of the FIG. 2 embodiment, the carbon screen 52 thus becomes a charged electrode which attracts and adsorbs the contaminants.

Figure 4:
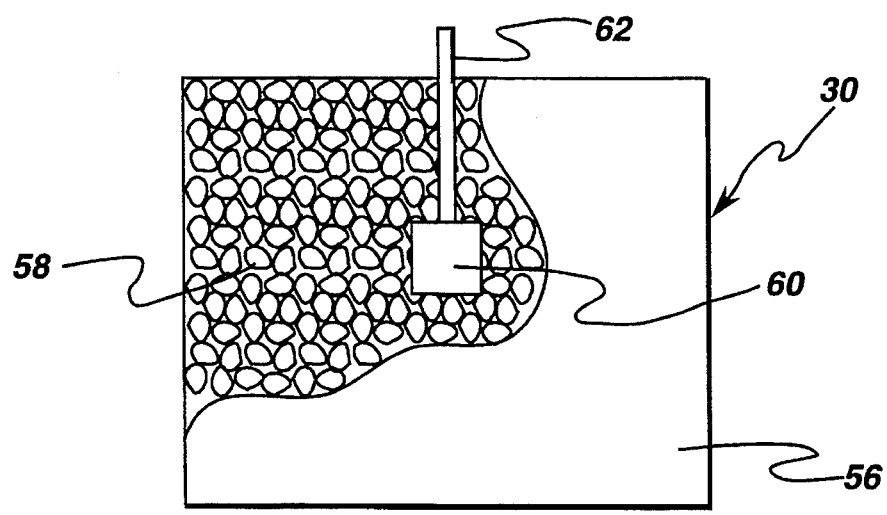
FIG. 4 is a partially cut away view of a third embodiment of the adsorbent electrode assembly of the present invention.

FIG. 4 shows yet another embodiment of the adsorbent electrode assembly 30 which adopts a "tea bag" configuration. That is, the adsorbent electrode assembly 30 comprises a plurality of porous bags 56 (only one shown in FIG. 4). The bags 56 can be suspended above the flotation cell for immersion into the froth. Each porous bag 56 is filled with an adsorbent material 58 such as carbon (powdered or granular) or rubber particles. Nitrile compound rubber particles have been found to be a particularly good adsorbent of PCBs. An electrode 60 is located in the bag 56 so as to be surrounded by the adsorbent material 58. The electrode 60 has a lead 62 which extends out of the bag 56 for connection to the battery (not shown in FIG. 4). The electrode 60 and the lead 62 can be made of any suitable electrically conducting material, such as platinum or carbon. The resulting charge on the electrode 60 attracts the contaminants in the froth toward the electrode 60. The contaminants then pass through the porous bag 56 and are adsorbed by the adsorbent material 58. Once the contaminants have been adsorbed, the porous bag 56 is easily removed from the flotation cell for replacement or regeneration.

The foregoing has described an adsorbent electrode assembly which facilitates the separation and removal of contaminants from a froth flotation cell. While specific embodiments of the present invention have been described, it will be apparent to those skilled in the art that various modifications thereto can be made without departing from the spirit and scope of the invention as defined in the appended claims.

What is claimed is:

1. A flotation cell for use in a soil washing system, said flotation cell comprising:

a tank for receiving a liquid slurry containing liberated contaminants in an emulsion;

means for injecting gas bubbles into said slurry inside said tank for gathering said contaminants thereto by attachment, with said bubbles and contaminants attached thereto rising by buoyancy to form a froth at the surface of said slurry in said tank;

an adsorbent electrode assembly disposed in said tank for contacting said froth; and a source of electricity having a first pole connected to said adsorbent electrode assembly and a second pole connected to said tank so that said electrode assembly electrically attracts and adsorbs said contaminants in said froth.

2. The flotation cell of claim 1 wherein said source of electricity is a DC source of electricity.

3. The flotation cell of claim 1 wherein said adsorbent electrode assembly comprises a carbon rod.

4. The flotation cell of claim 3 wherein said carbon rod is attached to a side wall of said tank for extending over said slurry in said froth.

5. The flotation cell of claim 1 wherein said adsorbent electrode assembly comprises a plurality of carbon rods.

6. The flotation cell of claim 1 wherein said adsorbent electrode assembly comprises a carbon screen.

7. The flotation cell of claim 1 wherein said adsorbent electrode assembly comprises a porous bag filled with an adsorbent material and having an electrode disposed therein.

8. A method of collecting contaminants in the froth of a froth flotation cell, said method comprising the steps of:

immersing an adsorbent electrode assembly into the froth; and applying an electric charge to said adsorbent electrode assembly to electrically attract and adsorb said contaminants from said froth.

9. A system for separating contaminants from a contaminated material comprising:

means for mixing said contaminated material with a liquid to make a slurry containing liberated contaminants in an emulsion;

a flotation tank disposed in flow communication with said mixing means for receiving said slurry;

means for injecting gas bubbles into said slurry inside said tank for gathering said contaminants thereto by attachment, with said bubbles and contaminants attached thereto rising by buoyancy to form a froth at the surface of said slurry in said tank;

an adsorbent electrode assembly disposed in said tank for contacting said froth; and means for electrically polarizing said electrode assembly and said tank to form negative and positive poles so that said electrode assembly electrically attracts and adsorbs said contaminants in said froth.

10. A system according to claim 9 wherein said electrode assembly comprises a carbon rod effective for both electrically attracting said contaminants and for adsorbing said contaminants.

11. A system according to claim 10 wherein said polarizing means effect said positive pole at said carbon rod.

12. A system according to claim 9 wherein said electrode assembly comprises a screen positionable in said tank for immersion in said froth.

13. A system according to claim 12 wherein said screen is carbon.

14. A system according to claim 9 wherein said electrode assembly comprises:

a porous bag positionable in said tank for immersion in said froth;

an adsorbent material disposed in said bag; and an electrode extending into said bag surrounded by said adsorbent material.

15. A system according to claim 14 wherein said adsorbent material is carbon.

16. A system according to claim 14 wherein said adsorbent material is nitrile compound rubber particles, and said contaminant is PCBs.

* * * * *